United States Patent
Otsuka et al.

[15] 3,668,219
[45] June 6, 1972

[54] PREPARING WATER INSOLUBLE ANTHRAQUINONE DYESTUFFS

[72] Inventors: Tokio Otsuka, Ashiya; Shozo Sasabe, Ibaragi; Hiroyuki Nakagawa, Nishinomiya, all of Japan

[73] Assignee: Sumitomo Chemical Company, Ltd., Osaka, Japan

[22] Filed: Apr. 1, 1970

[21] Appl. No.: 24,828

[30] Foreign Application Priority Data

Apr. 9, 1969 Japan....................44/27500

[52] U.S. Cl..................................260/325
[51] Int. Cl..................................C07d 27/50
[58] Field of Search.........................260/325

[56] References Cited

UNITED STATES PATENTS 3,326,934  6/1967  Akamatsu et al...............260/325

Primary Examiner—Alex Mazel
Assistant Examiner—Joseph A. Narcavage
Attorney—Stevens, Davis, Miller & Mosher

[57] ABSTRACT

Improvement for preparing water insoluble anthraquinone dyestuffs represented by the formula,

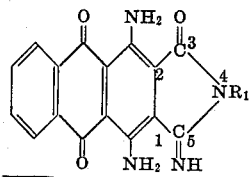

wherein $R_1$ is a saturated or unsaturated alkyl, cycloalkyl, aryloxyalkyl, aralkyl, aralkoxyalkyl or hydroxyalkyl having two to 12 carbon atoms, which comprises reacting 1-hydroxy-3-imino-4,7-diamino-5,6-phthalylisoindolenine or its tautomer with an alkylating agent in water or in an aqueous medium containing a small amount of an organic solvent.

7 Claims, No Drawings

PREPARING WATER INSOLUBLE ANTHRAQUINONE DYESTUFFS

The present invention relates to improvements in the preparation of water insoluble blue disperse dyestuffs of anthraquinone series represented by the formula,

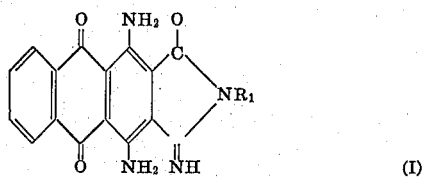

(I)

wherein $R_1$ represents a saturated or unsaturated alkyl, alkoxyalkyl, cycloalkyl, aryloxyalkyl, aralkyl, aralkyloxyalkyl or hydroxyalkyl, having two to 12 carbon atoms, and more particularly relates to a process for producing water insoluble anthraquinone dyestuffs represented by said formula (I) characterized by reacting a compound represented by the formula,

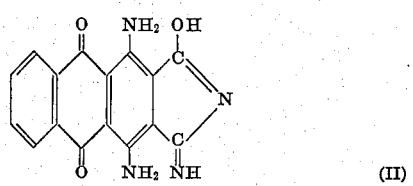

(II)

or its tautomer represented by the formula,

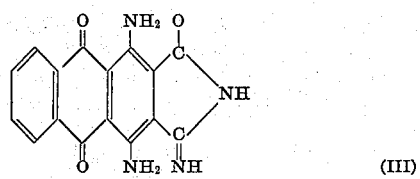

(III)

with an unsubstituted or substituted alkylating agent in water or in an aqueous medium containing a small amount of an organic solvent.

The above-mentioned compounds represented by the formulas (II) and (III) are tautomers to each other and are to be considered essentially a single compound.

For convenience, the compounds are hereinafter referred to as isoindolenine.

So far, the reaction between the isoindolenine and an alkylating agent such as alkyl p-toluenesulfonates is conducted in an organic aprotic or weak basic solvent as described in, for example, Japanese Patent Publication No. 3712/1966 U.S. Pat. No. 3,326,934).

It is considered inevitable to conduct the reaction between the isoindolenine and the alkylating agent in non-aqueous state because the presence of water brings about the decomposition of the alkylating agent.

And therefore, the reaction is always conducted with use of expensive organic solvents and with complicated operations such as drying and pulverizing the isoindolenine and dehydrating the alkylating agent.

Surprising is finding that the reaction between the isoindolenine and the alkylating agent may be conducted in water or in the aqueous medium with high yield and good qualities of the water insoluble anthraquinone dyestuffs represented by the formula (I).

It is therefore the principal object of the present invention to avoid the difficulties heretofore encountered in the alkylation in organic solvents for the production of the water insoluble anthraquinone dyestuffs (I).

It is a further object to provide a process for producing water insoluble anthraquinone dyestuffs (I) which is not only simple but also inexpensive in operation.

Another object of the present invention is to provide an improved process for the production of the water insoluble anthraquinone dyestuffs (I).

Another object of the invention is the provision of a process of alkylation in water or an aqueous solvent in a commercially feasible manner.

These and other objects of the present invention can be accomplished by the provision of, in the process for the production of the water insoluble anthraquinone dyestuffs (I) by reacting the isoindolenine with alkylating agents in organic solvents, the improvement which comprises conducting the reaction in water or in an aqueous medium containing a small amount of an organic solvent.

Thus, the process of the present invention can be practiced commercially at a low cost and is simple in operation because it requires no use of an expensive organic solvent. The greatest advantage of the process of the present invention is the fact that the isoindolenine and an alkylating agent as starting materials can be directly used in the form of wet cake without drying or pulverizing them and there is no necessity for completely dehydrating the starting materials before use. It is of high value in the practical commercial manufacture of the water insoluble anthraquinone dyestuffs (I).

More concretely, in the process of the present invention, the isoindolenine may be reacted with an unsubstituted or substituted alkylating agent in water or in an aqueous medium containing a small amount of an organic solvent in the presence of an acid binding agent at a temperature of 60° to 150°C.

The unsubstituted or substituted alkylating agents which may be used in the present invention are represented by the formula, $$R_2 - SO_2 - O - R_1 \quad (IV)$$

or the formula, $$R_1 - X \quad (V)$$

wherein $R_1$ is as defined above; $R_2$ represents an aromatic or aliphatic radical; and X represents a halogen atom. They include, for example, methoxyethyl p-toluenesulfonate, ethoxyethyl p-toluenesulfonate, butoxyethyl p-toluenesulfonate, ethyl p-toluenesulfonate, propyl p-toluenesulfonate, cyclohexyl benzenesulfonate, phenylethyl p-toluenesulfonate, butylcellosolve p-toluenesulfonate and halides of the alkyls or substituted alkyls such as allyl chloride, β-methallyl chloride and benzyl chloride. The halogens are advantageously chlorine and bromine.

The organic solvents include, for example, benzene, toluene, xylene, monochlorobenzene, dichlorobenzenes, nitrobenzene, dioxane, ethylene glycol monoethyl ether, dimethyl sulfoxide and alcohols.

The amount of water or the aqueous medium is preferably 5 to 15 times the amount on the weight of the isoindolenine.

It is not necessary to limit the amount of the solvents used in the present process.

It is, however, preferable to use the solvents in an amount of 30 percent by weight or less based on the weight of water only from economical point of view.

The acid binding agents include organic weakly basic compounds such as tertiary amines i.e. pyridine, picolines, dimethylaniline and diethylaniline and mixtures thereof, and sodium and potassium bicarbonates as well as sodium, potassium, magnesium and calcium carbonates.

The water insoluble anthraquinone dyestuffs of the formula (I) produced by the process of the present invention have high affinity for synthetic fibers, particularly polyester fiber and can give greenish blue dyeings with fastness to light, sublimation and washing.

The following examples will serve to illustrate the practice of the invention in more detail, but are, of course, not intended to limit the scope of the present invention.

Example 1

A mixture of 80 g. of wet cake containing 16 g. of 1-hydroxy-3-imino-4,7-diamino-5,6-phthaloylisoindolenine, 80 c.c. of water, 4 g. of monochlorobenzene, 11 g. of sodium carbonate, 0.1 g. of pyridine and 28.5 g. of isopropyl p-toluenesulfonate was heated at 100°C. for 20 hours and then cooled. The crystals separated by filtration were washed with methanol and water and dried to obtain 15.5 g. of a greenish blue dyestuff for polyester fiber represented by the structural formula,

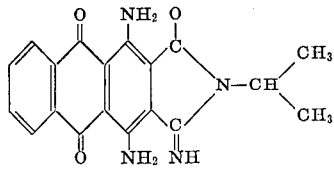

Example 2

A mixture of 96 g. of wet cake containing 12 g. of 1-hydroxy-3-imino-4,7-diamino-5,6-phthaloylisoindolenine, 40 c.c. of water, 8.4 g. of sodium bicarbonate, 1 g. of pyridine and 21.4 g. of n-butyl p-toluenesulfonate was heated in an autoclave at 110° to 120° C. for 7 hours and then cooled. The crystals separated by filtration were thoroughly washed with methanol and then with water to obtain 11.85 g. of a dyestuff represented by the structural formula,

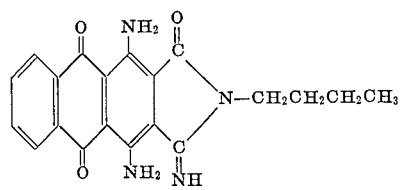

When the pyridine was replaced by dimethylaniline in this example, a similar result was obtained.

Example 3

A mixture of 122 g. of wet cake containing 14 g. of 1-hydroxy-3-imino-4,7-diamino-5,6-phthaloylisoindolenine, 12 g. of sodium carbonate, 1.5 g. of pyridine and 28 g. of β-methoxyethyl p-toluenesulfonate was heated at 95° to 100° C. for 20 hours and then cooled. The crystals separated by filtration were washed with methanol and water and dried to obtain 14.1 g. of a greenish blue dyestuff for polyester fiber represented by the structural formula,

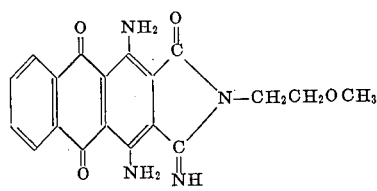

Example 4

When the β-methoxyethyl p-toluenesulfonate was replaced by phenylethyl p-toluenesulfonate in Example 3, 15.1 g. of a dyestuff represented by the structural formula,

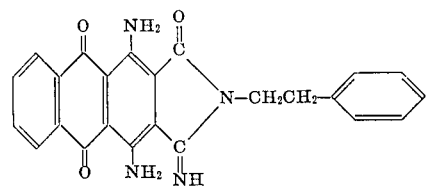

was obtained.

Example 5

A mixture of 30 g. of wet cake containing 3 g. of 1-hydroxy-3-imino-4,7-diamino-5,6-phthaloylisoindolenine, 5 g. of nitrobenzene, 5 g. of sodium bicarbonate, 2 g. of picoline and 3.7 g. of benzyl chloride was heated at 100° C. for 10 hours. The reaction mixture was then cooled and diluted with methanol. The crystals separated by filtration were washed with methanol and water and dried to obtain 3.2 g. of a dyestuff represented by the structural formula,

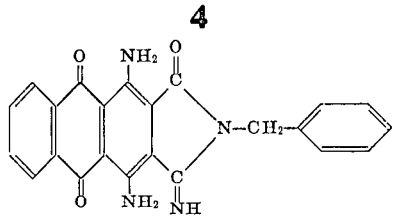

Example 6

A mixture of 100 g. of wet cake containing 10 g. of 1-hydroxy-3-imino-4,7-diamino-5,6-phthaloylisoindolenine, 10 g. of isobutanol, 8 g. of sodium carbonate, 0.5 g. of pyridine and 16 g. of n-butyl p-toluenesulfonate was heated at 95° to 100° C. for 20 hours and then cooled. The crystals separated by filtration were thoroughly washed with methanol and then with water to obtain 10.1 g. of a dyestuff represented by the structural formula,

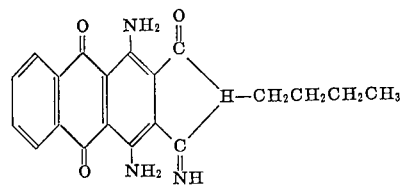

Example 7

A mixture of 65 g. of wet cake containing 15 g. of 1-hydroxy-3-imino-4,7-diamino-5,6-phthaloylisoindolenine, 12 g. of sodium carbonate, 1.5 g. of pyridine, 3.7 g. of nitrobenzene and 30 g. of butylcellosolve p-toluenesulfonate was heated at 90° to 95° C. for 15 hours and then cooled. The crystals separated by filtration were thoroughly washed with methanol and then with water to obtain 17.6 g. of a dyestuff represented by the formula,

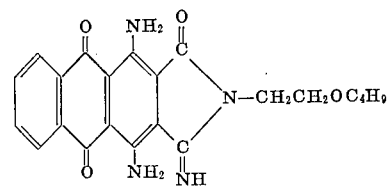

We claim:

1. In a process for producing a water insoluble anthraquinone dyestuff represented by the formula,

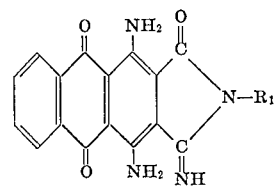

wherein $R_1$ represents a saturated or unsaturated alkyl, alkoxyalkyl, cycloalkyl, aryloxyalkyl, aralkyl, aralkyloxyalkyl or hydroxyalkyl having two to 12 carbon atoms, by reacting a compound represented by the formula,

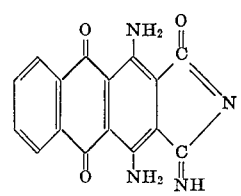

or its tautomer represented by the formula,

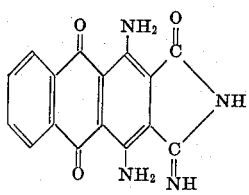

with an unsubstituted or substituted alkylating agent in an organic solvent, the improvement which comprises conducting the reaction in water or in an aqueous medium containing 30 percent by weight or less of an organic solvent selected from the group consisting of benzene, toluene, xylene, monochlorobenzene, dichlorobenzenes, nitrobenzene, dioxane, ethylene glycol monoethyl ether, dimethyl sulfoxide and alcohols, based on the weight of water.

2. A process according to claim 1 wherein said alkylating agent is a compound represented by the formula, $R_2 - SO_2 - O - R_1$ or
$R_1 - X$ wherein $_1$ is as defined in claim 1; $R_2$ is an aromatic or aliphatic radical; and X is a halogen atom.

3. A process according to claim 2 wherein said alkylating agent is selected from the group consisting of methoxyethyl p-toluenesulfonate, ethoxyethyl p-toluenesulfonate, butoxyethyl p-toluenesulfonate, ethyl p-toluenesulfonate, propyl p-toluenesulfonate, cyclohexyl benzenesulfonate, phenylethyl p-toluenesulfonate, butylcellosolve p-toluenesulfonate, allyl chloride, β-methallyl chloride and benzyl chloride.

4. A process according to claim 3 wherein said halides are chlorides or bromides.

5. A process according to claim 1, wherein the reaction is conducted in the presence of an acid binding agent.

6. A process according to claim 5, wherein the acid binding agent is sodium and potassium bicarbonates, sodium, potassium, magnesium and calcium carbonates, pyridine, picoline, dimethylaniline, diethylaniline or a mixture thereof.

7. A process according to claim 1, wherein the reaction is conducted at a temperature from 60° to 150° C.

* * * * *